United States Patent [19]
Imaki et al.

[11] Patent Number: 5,771,035
[45] Date of Patent: Jun. 23, 1998

[54] CHARACTER GENERATION DEVICE

[75] Inventors: Yoshiko Imaki; Susumu Hasegawa; Minehiro Konya, all of Osaka; Yutaka Shigi, Nara; Masayuki Fujisawa; Megumi Ito, both of Nara, all of Japan

[73] Assignee: Sharp Kabushiki Kaisha, Osaka, Japan

[21] Appl. No.: 729,427

[22] Filed: Oct. 11, 1996

[30] Foreign Application Priority Data

Oct. 13, 1995 [JP] Japan ................................. 7-265263

[51] Int. Cl.$^6$ .......................................................... G09G 5/22
[52] U.S. Cl. ............................ 345/143; 345/142; 345/471
[58] Field of Search .................................... 345/143, 142, 345/141, 192, 194, 195, 26, 471, 467, 468, 469, 470; 395/167, 171, 172, 168, 169, 170, 141; 382/293, 301

[56] References Cited

FOREIGN PATENT DOCUMENTS 3234559 10/1991 Japan .
456894 2/1992 Japan .

Primary Examiner—Dennis-Doon Chow

[57] ABSTRACT

A character generation device that easily implements a multiple-font system without increasing the data amount is provided. Character data of a basic font is stored in a character data storage while paste component data is stored in a paste component data storage. A shape recognizer determines a length and an angle of a process-target element as well as an angle of a stroke to which the process-target element belongs, by referring to a font attribute storage based on a font code and character number specified from a keyboard. A paste component data modifier performs scaling up/down processing and rotation processing with the selected paste component data by referring to the font attribute storage. A data synthesizer generates character data that paste components, subjected to the scaling up/down process and the rotation process, are applied onto the process-target element. Thus, by applying paste components to the process-target element in the basic font, a multiple-font system can be implemented with small amounts of data.

14 Claims, 20 Drawing Sheets

Fig.2

| Font code 31 | Name of font to be generated 32 | Basic font code 33 | Component number 34 | | Modification information 35 | | | |
|---|---|---|---|---|---|---|---|---|
| | | | 36 | 37 | 38 | 39 | 40 | 41 |
| 1 | POP | 1 | — | — | N | N | N | N |
| 2 | TWIG | 1 | 1 | 2 | Y | Y | N | Y |
| 3 | PRINCESS | 1 | 3 | 4 | Y | N | Y | Y |
| 4 | CRYSTAL | 1 | 5 | — | Y | Y | Y | Y |
| 5 | PIERROT | 1 | 6 | 7 | Y | N | Y | N |
| 6 | TUKUSI | 1 | 8 | 9 | N | N | Y | Y |
| ... | ... | ... | ... | ... | ... | ... | ... | ... |

Fig.4
| | | |
|---|---|---|
| Component code | 57 { 3 | ← Component number |
| | 1 | ← Number of polygons constituting character |
| Polygon information | 58 { 1 | ← Polygon number |
| | 13 | ← Number of points constituting polygon |
| Point information | 59 { 1 | ← Point number |
| | −50 | ← x-coordinate |
| | 30 | ← y-coordinate |
Fig.5A
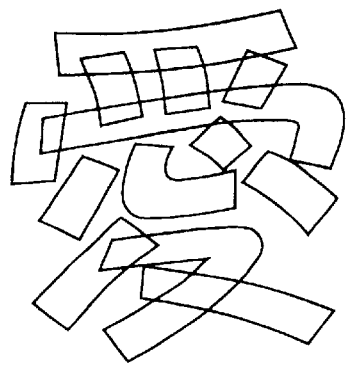
Fig.5B
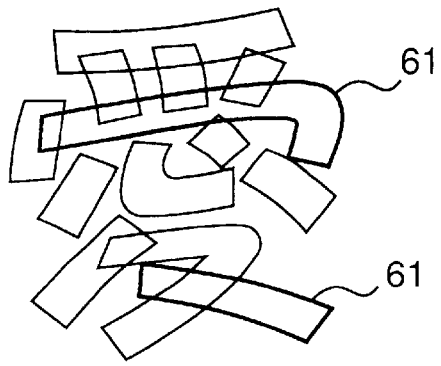

71 (Polygon No. 13)

*Fig. 13A* Component No.1
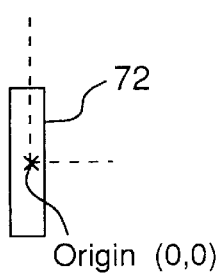
*Fig. 13B* Component No.2
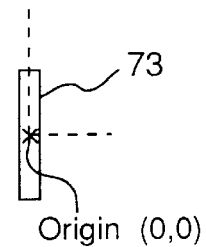
*Fig. 13C* Component No.3
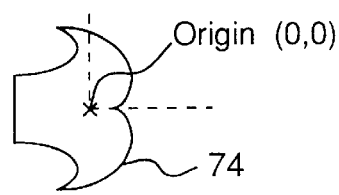
*Fig. 13D* Component No.4
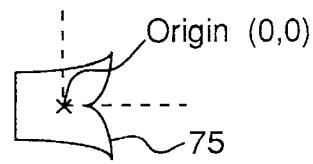
*Fig. 13E* Component No.5
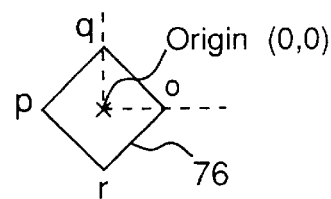
*Fig. 13F* Component No.6
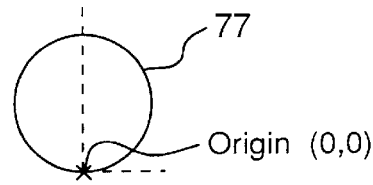
*Fig. 13G* Component No.7
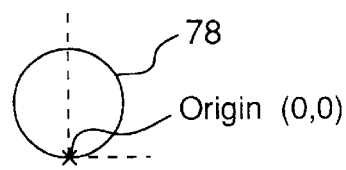
*Fig. 13H* Component No.8
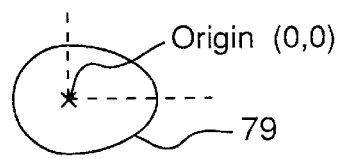
*Fig. 13I* Component No.9
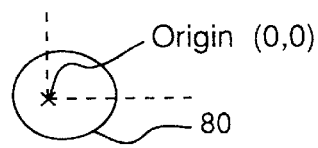

CHARACTER GENERATION DEVICE

BACKGROUND OF THE INVENTION

1. Field of the Invention

The present invention relates to an improvement in the character generation device that allows a multiple font system to be realized.

2. Description of the Prior Art

For Japanese characters, creating one font requires preparation of many much more characters than European fonts do. As for the number of characters, whereas any one European font involves around 200 characters, the Japanese language involves about 7000 characters per font. Therefore, the character generation device would require a great deal of labor and time for registration of any newly created font in addition to previously registered fonts. It would also involve enormous volumes of data to be newly registered.

In some of the fonts, only changing the shape of elements allows a font quite different in impression to be generated (in some cases, recognized as absolutely another font). Thus, there have been proposed methods for generating different fonts by changing the shape of the elements (Japanese patent Laid-Open publications No. HEI 3-234559 and HEI 4-56894). In these cases, the elements refer to end portions (portions indicated by bold lines in FIG. 31B) 3 of strokes 2a, 2b, 2c, . . . constituting a character 1, as shown in FIGS. 31A and 31B.

Below is described a method for generating different fonts by changing the shape of the elements, according to the contents of Japanese patent Laid-Open publications No. HEI 3-234559 and HEI 4-56894.

First, a brief description is made of Japanese patent Laid-Open publication No. HEI 3-234559 with reference to FIGS. 32A to 32C. The outline of each of the strokes constituting one character in Gothic is expressed with outline character data approximated by straight lines and Bezier curves. Then, as shown in FIG. 32A, a plotting point "c" is set intermediately between plotting points "a" and "b" of both ends of an element 3. As shown in FIG. 32B, plotting points "a'", "b'" are also set at positions advanced by a specified distance from the plotting points "a", "b", respectively, along the outlines in the stroke, and then the plotting points "a", "b" are deleted. Finally, as shown in FIG. 32C, by using the newly set three plotting points "a'", "b'", and "c", a font having such elements where the elements in Gothic have been pointed, is generated.

Next, a brief description is made of Japanese patent Laid-Open publication No. HEI 4-56894 with reference to FIGS. 33A to 33C. First vector character data is generated in which displaced-point coordinates of the outline of each of the strokes constituting one character are expressed as a vector. Then, as shown in FIG. 33A, vector character data of the element 3 is deleted, and replaced with vector character data of an end-point shape 4 as shown in FIG. 33B that has previously been registered in an endpoint shape storage. Thus, a rounded Gothic font is formed from the Gothic, as shown in FIG. 33C.

However, in the conventional method for generating another font by changing the shape of the elements, there have been some problems as described below.

First, in Japanese patent Laid-Open publication No. HEI 3-234559, plotting points (or control points) are newly calculated and derived with outline character data approximated by straight lines and Bezier curves, so that element shape is changed. This will do for general cases of changes in the element shape. However, since the plotting points (control points) are newly derived through calculation, it is very difficult to change the elements into complex element shapes, which is one issue.

In Japanese patent Laid-Open publication No. HEI 4-56894, vector character data of an element portion is, after being deleted once, replaced with vector character data of an end-point shape that has previously been registered. This also will do for general cases of changes in the element shape. However, since the element portion is simply replaced with a previously prepared end-point shape, there are some cases where, if the process-target element is angled to some degree with respect to the direction in which the stroke extends, designing the character after the replacement of element shape may be hindered, whereas if the element is oriented vertical to the direction in which the stroke extends, there are no problems.

Further, since the end-point shape is obtained by once deleting vector character data of the element portion and then reconnecting vector character data of another endpoint shape, the resulting character after the change in element shape is expressed by one outline. That is, it is impossible to incorporate an independent figure inside the outline that represents a character. It is therefore impossible to generate a font containing independent inverted display portions 5 as shown in FIG. 34.

In recent years, with an increasing recognition of desk top publishing, there has been an increasing need for implementing a wider variety of fonts with an abundance of originalities. Unfortunately, on the other hand, the hardware has increasingly been downsized and personalized, bringing about an issue that, in particular, fonts involve too large volumes of data.

SUMMARY OF THE INVENTION

The object of the present invention is therefore to provide a character generation device that allows a fast multiple-font system to be easily implemented without increasing the amount of data.

In order to achieve the aforementioned object, the present invention provides a character generation device for generating characters of a new font by superposing a component of a shape on a process-target part of a character in a basic font to change a shape of the process-target part, the character generation device comprising:

a font attribute storage for storing font attributes comprising a font code showing a font, a name of the font, a basic font code showing a font that serves as a basis of the pertinent font, a component code showing a component to be used for generation of the font, and modification information for generating the font;

a character data storage for storing character data representing the shape of a character in the basic font;

a component data storage for storing component data representing the shape of the component;

an input section for specifying a font to be generated;

a shape recognizer for reading out from the character data storage the character data of a character in a font that serves as the basis of the font specified from the input section, with reference to the font attributes, and recognizing the shape of a process-target part of the character in the basic font based on the read-out character data;

a component data modifier for reading out, from the component data storage, component data to be used for the generation of the font specified from the input section with reference to the font attributes, and modifying the read-out component data based on the shape of the processtarget part so that size and disposition of the component to be used matches the shape of the process-target part; and a data synthesizer for generating character data of a character in the specified font, which character is made up by superposing the component on the process-target part of a character in the basic font, based on both the character data of the basic font read out by the shape recognizer and the component data modified by the component data modifier.

With this arrangement, based on character data of the basic font read out by the shape recognizer and component data modified by the component data modifier, character data for a character in the specified font, in which character the component used is superposed on the process-target part of the character in the basic font, is generated by the data synthesizer.

Therefore, without calculating new plotting points or deleting/reconnecting plotting points, characters of a new font are generated by the modification and superposition of the component data with less manhours.

In an embodiment, the character data stored in the character data storage has superposition information to be used for the superposition of the component, for each of individual process-target parts of a character in the basic font and for each of individual fonts to be generated.

With this arrangement, even with the same character in the basic font, different superposition methods are set for different parts to be processed or different fonts to be generated.

In an embodiment, the shape recognizer decides a component superposition method with reference to the modification information of font attributes, as well as a corresponding font and superposition information of the process-target part in the read-out character data, and performs the recognition of the shape based on a result of this decision.

With this arrangement, even with the same character in the basic font, contact between components or between component and process-target part can be avoided by using different superposition methods for different parts to be processed or fonts to be generated.

In an embodiment, the process-target part, the shape of which is recognized by the shape recognizer, is an element which is an end portion of any of strokes constituting the character; and the shape recognizer recognizes length of the element in a character in the basic font.

With this arrangement, the length of the component to be used can be optimally set so as to match the length of the character in the basic font.

In an embodiment, the process-target part the shape of which is recognized by the shape recognizer is a stroke constituting the character and an element which is an end portion of the stroke; and the shape recognizer recognizes a tilt angle of at least either one of the element of a character in the basic font or the stroke to which the element belongs.

With this arrangement, the tilt angle of the component to be used can be optimally set so as to match the tilt angle of at least either one of the element or the stroke of the character in the basic font.

In an embodiment, the component data modifier modifies the component data so that the length of the component to be used matches the length of the element or that the tilt angle of the component to be used matches the tilt angle of at least one of the element and the stroke.

With this arrangement, since the length of the component to be used is set so as to match the length of the element or the tilt angle of the component to be used is set to a tilt angle matching the tilt angle of at least either one of the element or the stroke, the length or tilt angle of the component superposed on the process-target part becomes a length or tilt angle free from any sense of incongruity.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a view showing an example of the constitution of font attributes stored in a font attribute storage in FIG. 1;

FIG. 4 is a view showing an example of the constitution of paste component data stored in a paste component data storage in FIG. 1;

FIGS. 5A and 5B are explanatory views of polygons;

FIGS. 13A, 13B, 13C, ..., and 13I are views showing an example of a paste component;

DETAILED DESCRIPTION OF THE PREFERRED EMBODIMENTS

Hereinbelow, the present invention is described in more detail by embodiments thereof which are illustrated in the accompanying drawings.

Figure 1:
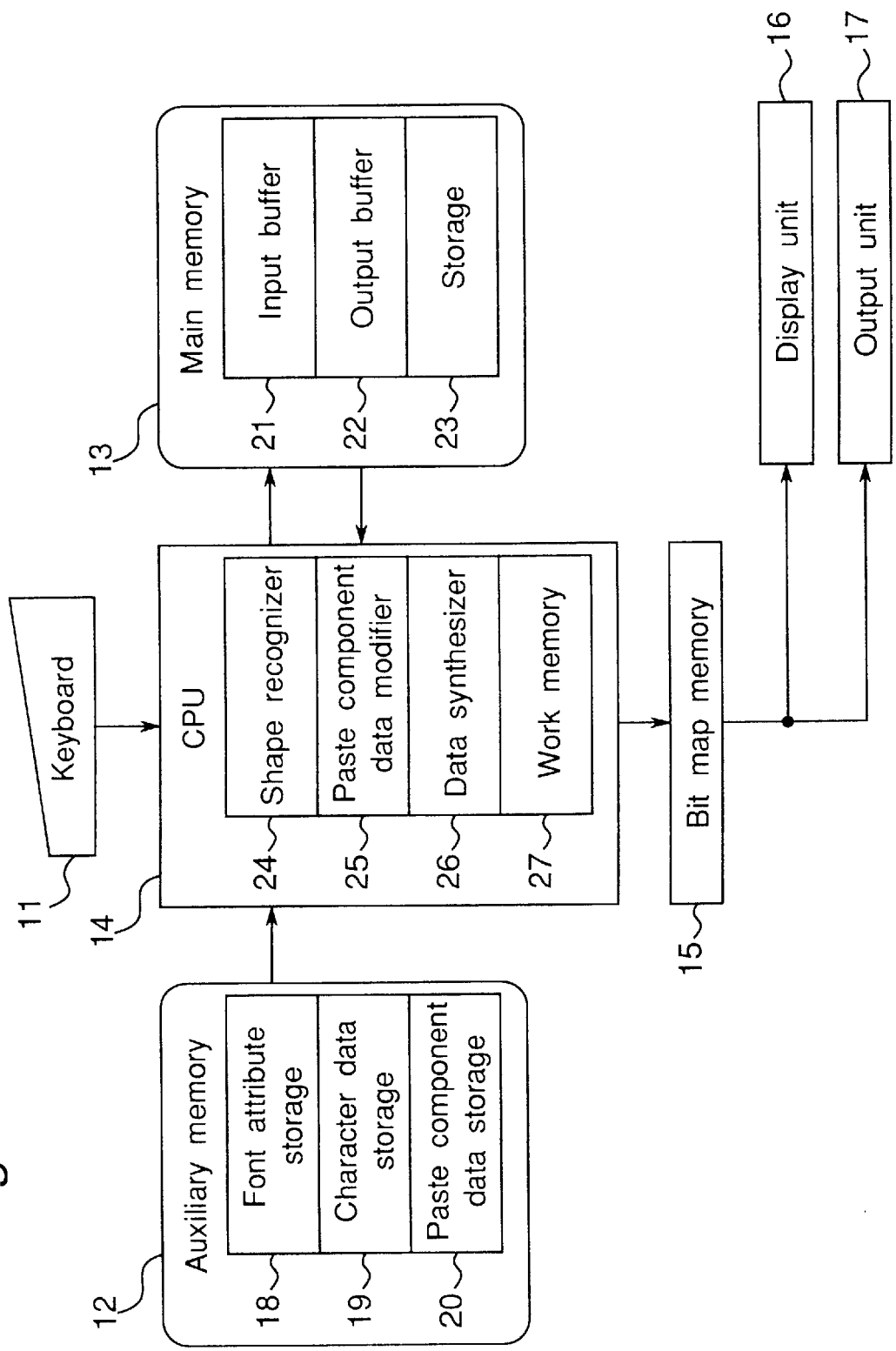
FIG. 1 is a block diagram of the character generation device of the present invention.

FIG. 1 is a block diagram of the character generation device of this embodiment. This embodiment is described on a case where outline character data obtained by approximating the outline of each of the strokes constituting one character with straight lines and Bezier curves made up from plotting points and control points is used as character data. However, the character data used in the present invention is not limited to this.

As shown in FIG. 1, the character generation device generally comprises a keyboard 11, an auxiliary memory 12, a main memory 13, a CPU (central processing unit) 14, a bit map memory 15, a display unit 16, and an output unit 17.

The keyboard 11 is used to input the font code of a font to be generated and the character number of a character. The auxiliary memory 12 has: a font attribute storage 18 for storing font attributes which are information about the superposition for each of the fonts to be generated; a character data storage 19 for storing outline character data of the font that serves as the basis of a font to be generated; and a paste component data storage 20 for storing paste component data to be used in changing the shape of a process-target part of the basic font. The main memory 13 has: an input buffer 21 for temporarily storing outline character data read out from the auxiliary memory 12; an output buffer 22 for temporarily storing paste component data of a modified shape; and a storage 23 for storing shape modification information.

It is noted that one figure represented by the paste component data is hereinafter referred to as a paste component.

The CPU 14 has: a shape recognizer 24 for extracting a process-target part of outline character data of the basic font and recognizing its shape; a paste component data modifier 25 for modifying the shape of a paste component; a data synthesizer 26 for synthesizing the results obtained by the shape recognizer 24 and the paste component data modifier 25 to generate outline character data of a character of a new font; and a work memory 27. The CPU 14 performs the control of character generation based on the various data stored in the auxiliary memory 12 and the main memory 13. The bit map memory 15 develops the pattern of the character generated under the control of the CPU 14, into bit map data, and transmits it to the display unit 16 or the output unit 17. The display unit 16 displays a character image based on the bit map data derived from the bit map memory 15. The output unit 17, which is provided by a printer or the like, prints characters based on the bit map data derived from the bit map memory 15.

Figure 12A:
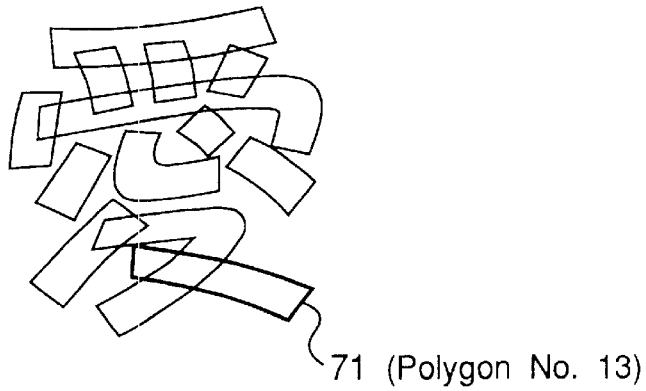
FIGS. 12A and 12B are actual explanatory views of outline character data shown in FIG. 3.
Figure 12B:
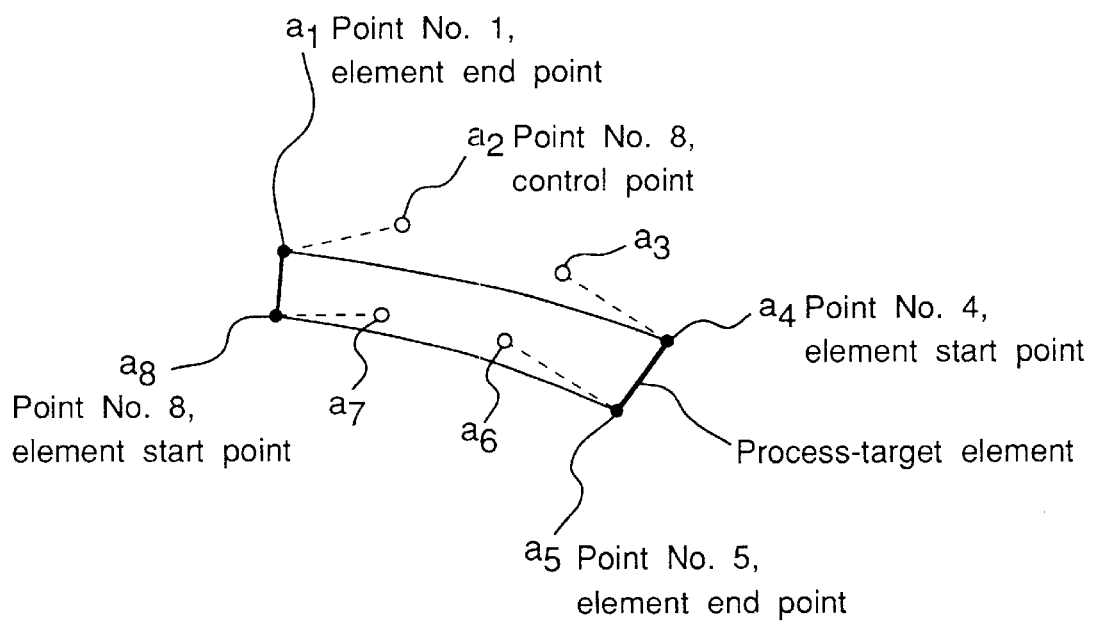

It is noted that in the outline character data expressed by straight lines and Bezier curves as shown in FIG. 5A, a pouch-like closed FIG. 61 formed by the outline of a stroke as shown in FIG. 5B is referred to as a polygon. When the outline character data making up the polygon 61 are arranged clockwise, the interior of the polygon 61 is hatched (FIGS. 14A to 14E). On the other hand, when the outline character data are arranged counterclockwise, the interior of the polygon 61 is blanked (FIGS. 12A and 12B).

The term used hereinafter "paste (pasting)" refers to superposing separately prepared paste component data on a process-target part in outline character data of the basic font.

Next, the auxiliary memory 12 is explained in detail.

As stated above, the font attribute storage 18 has stored therein font attributes which are information about the superposition for each of the fonts to be generated. As shown in FIG. 2, the font attributes are comprised of a font code 31 showing a font to be generated, the name 32 of the font to be generated, a basic font code 33 showing a font that serves as the basis of the font to be generated (basic font), a component number 34 showing a component to be used for the generation, and modification information 35 necessary for the superposition process.

The component number 34 is specified by a first component number 36 and a second component number 37, distinctively, when two kinds of paste components are present in correspondence to the font to be generated, where the first component number 36 represents a standard paste component (hereinafter referred to as a first component) and the second component number 37 represents a special paste component (hereinafter referred to as a second component).

The modification information 35 is used to specify a component pasting method effective to all the process-target parts in a character of the basic font. The modification information 35 is comprised of scaling information 38 for specifying whether or not the paste component is scaled up/down in accordance with the size of the element, information 39 for specifying whether or not the tilt angle of the element is determined, information 40 for specifying whether or not the tilt angle of the stroke is determined, and information 41 for specifying whether or not the midpoint of the element is taken as the reference point of component pasting.

It is noted that the items of specification in the component number 34 and the modification information 35 may be appropriately increased in number.

Figure 3:
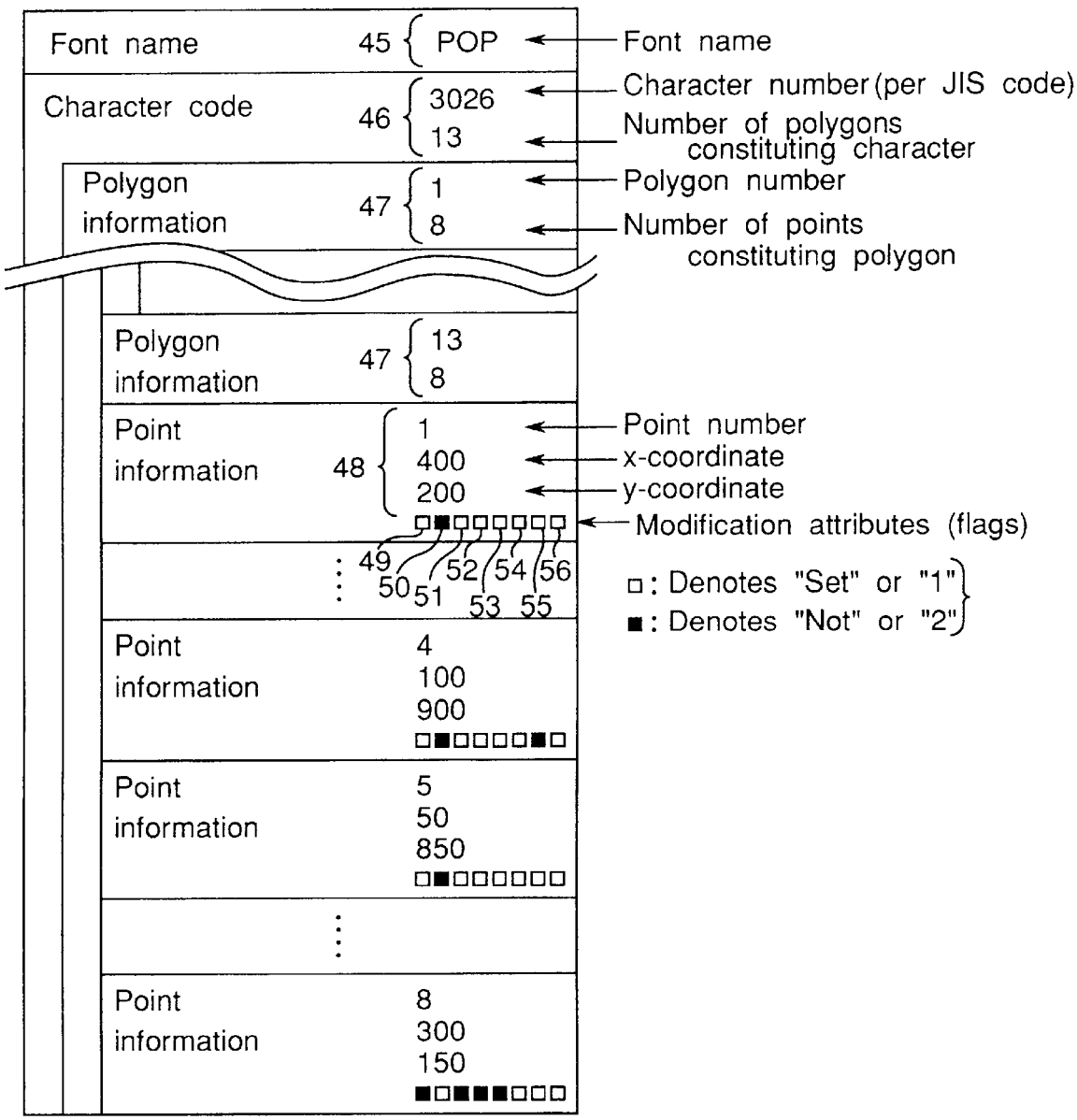
FIG. 3 is a view showing an example of the constitution of outline character data stored in the character data storage in FIG. 1.
Figure 6:
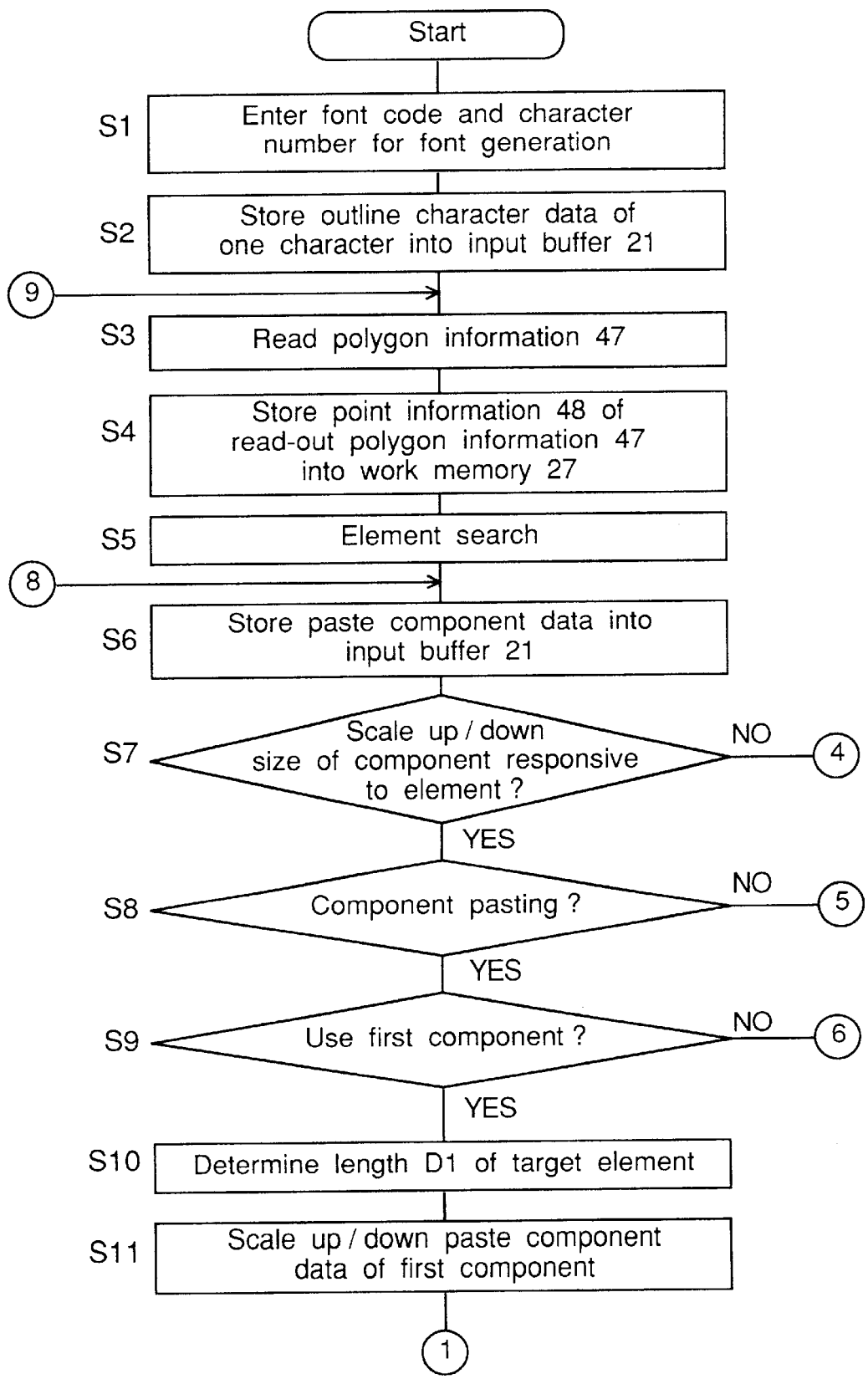
FIG. 6 is a flow chart of a characteristic generation process to be executed under the control of a CpU in FIG. 1.
Figure 7:
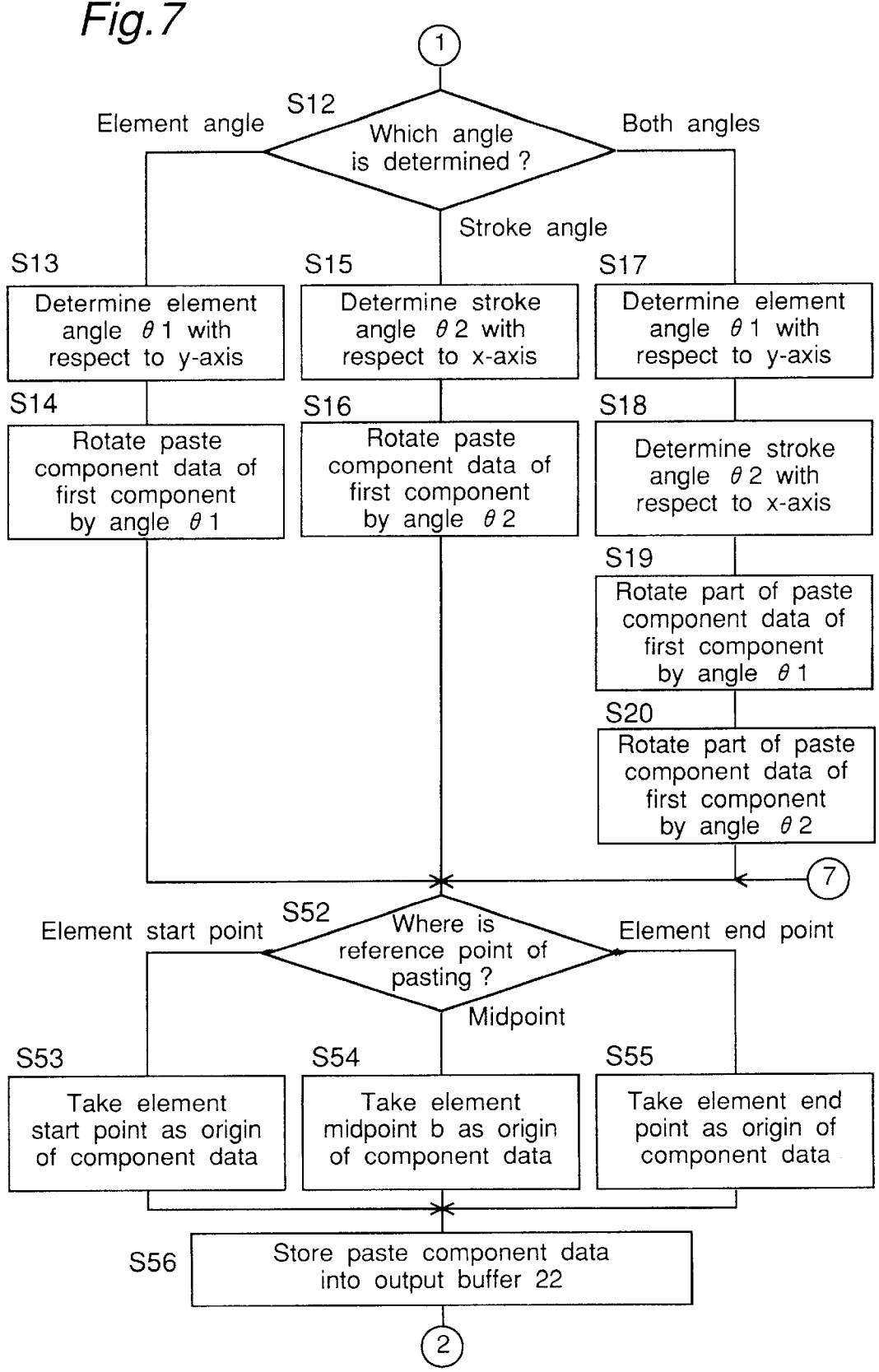
FIG. 7 is a flow chart of a characteristic generation process subsequent to FIG. 6.
Figure 8:
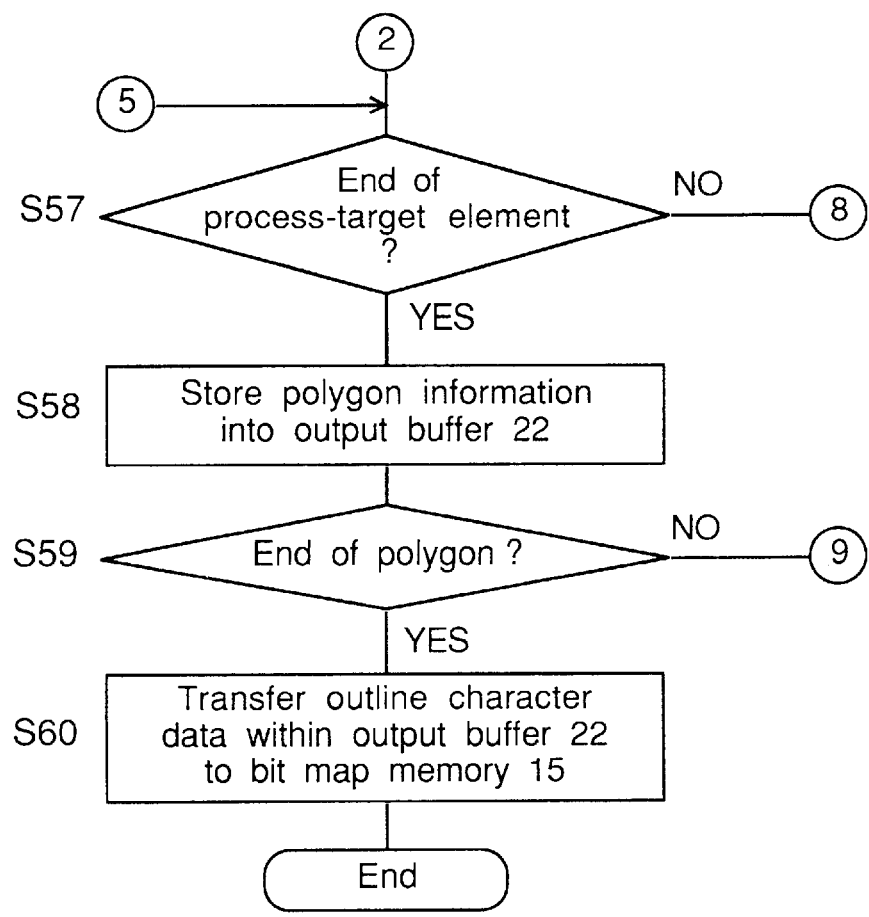
FIG. 8 is a flow chart of a character generation process subsequent to FIG. 7.
Figure 9:
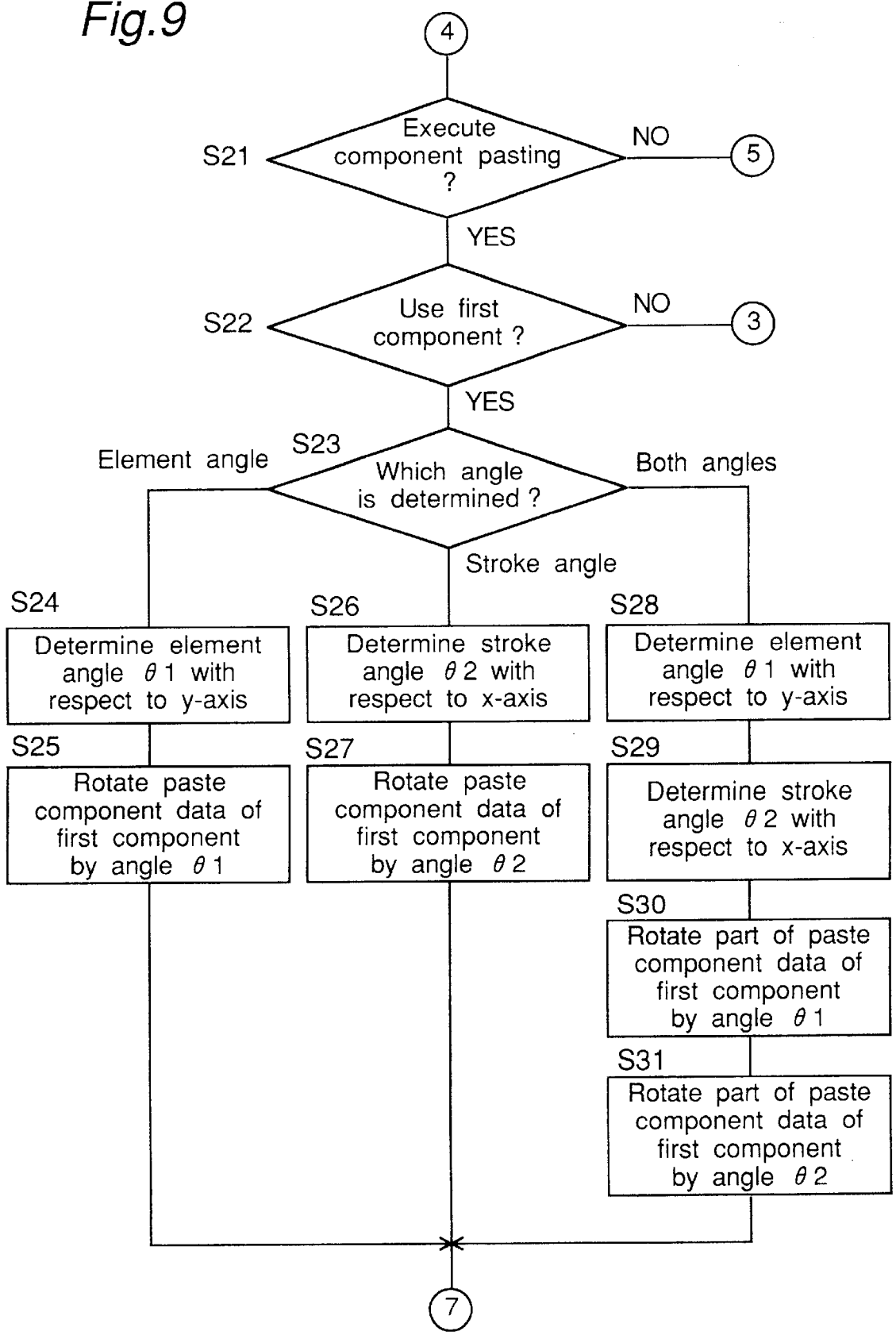
FIG. 9 is a flow chart of a character generation process subsequent to FIG. 6.
Figure 10:
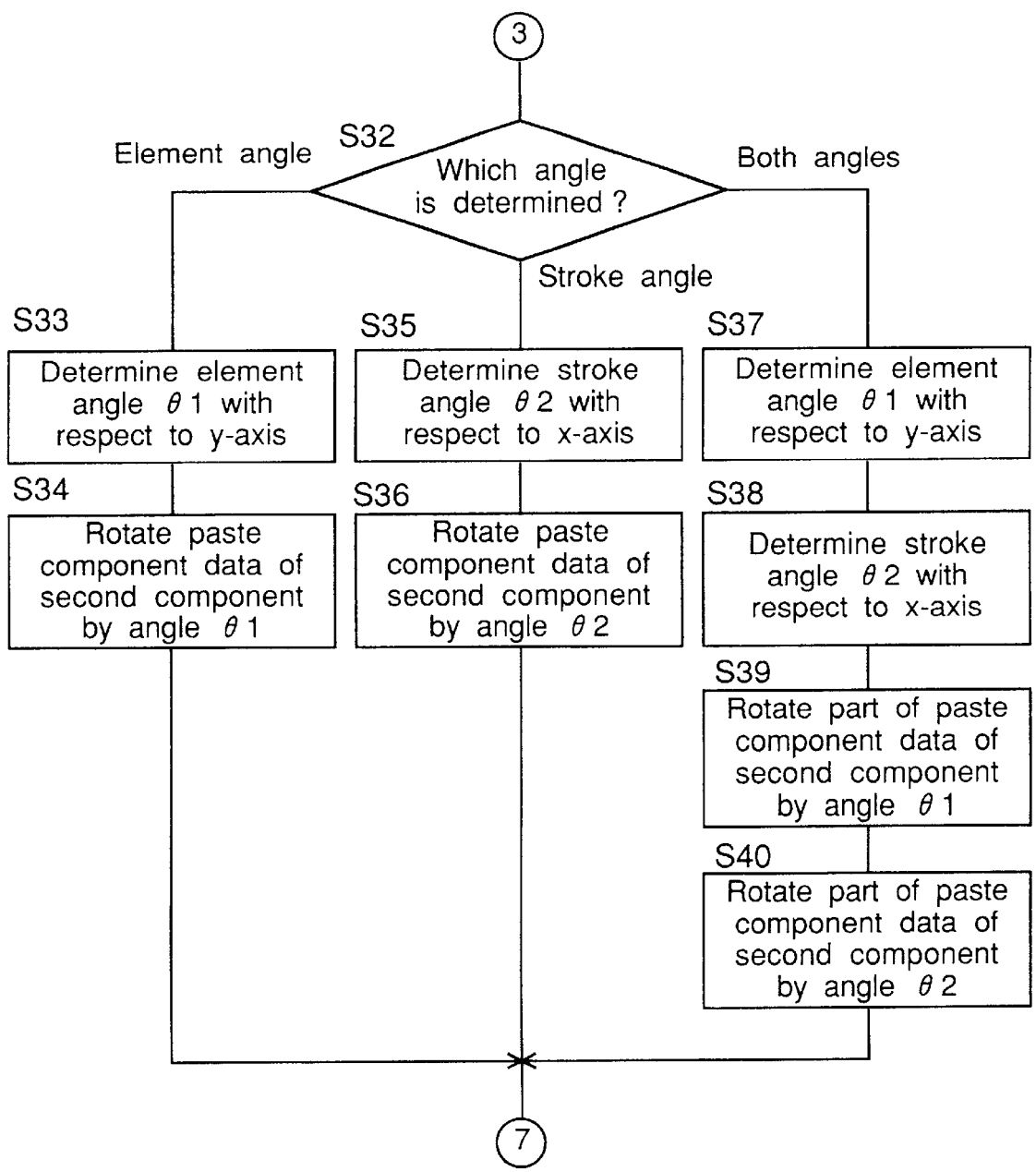
FIG. 10 is a flow chart of a character generation process subsequent to FIG. 9.
Figure 11:
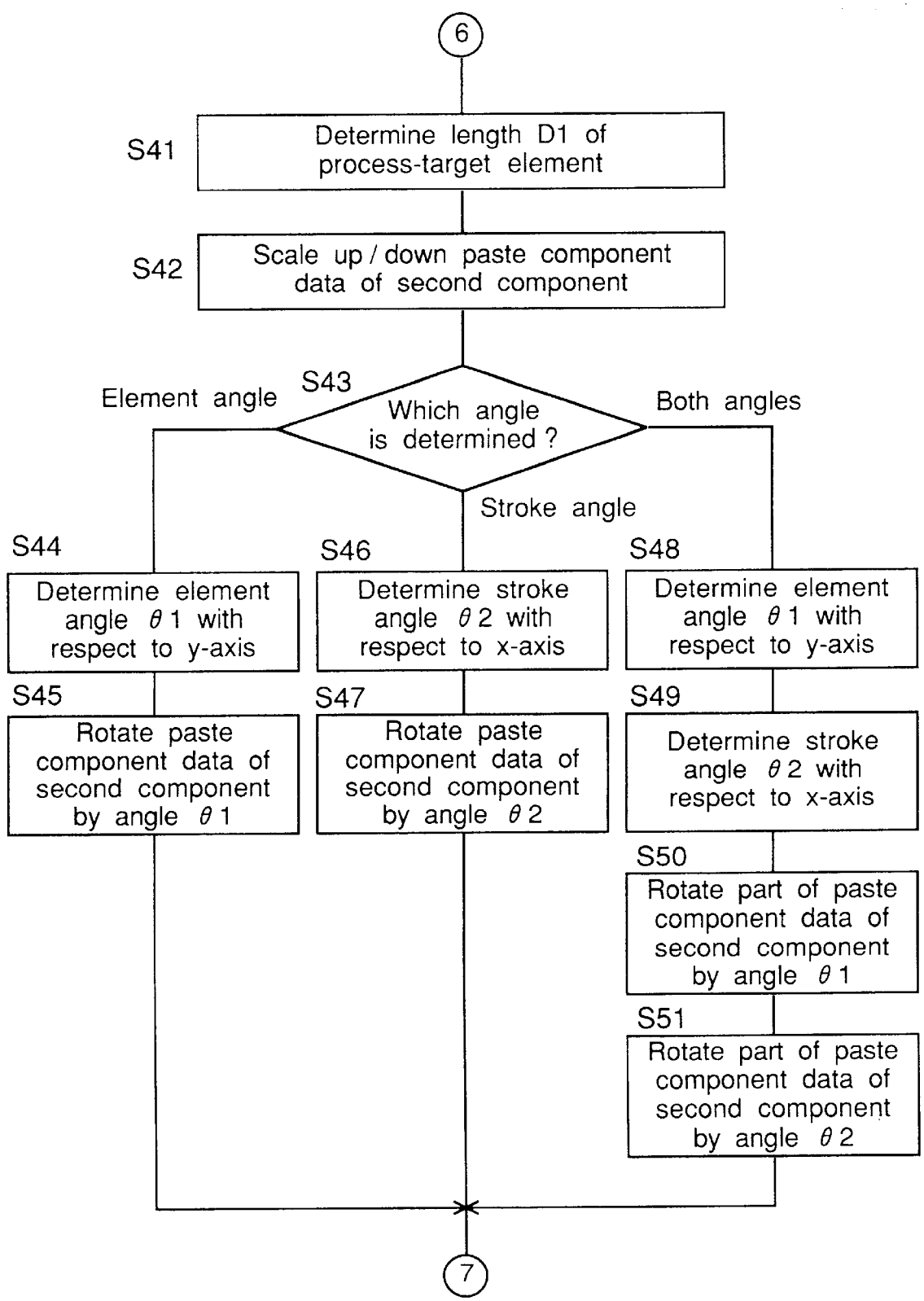
FIG. 11 is a flow chart of another character generation process subsequent to FIG. 6.

The character data storage 19 has stored therein outline character data of the font that serves as the basis of a font to be generated. As shown in FIG. 3, this outline character data is comprised of a font name 45 showing the designation of a font, a character code 46 showing each character of the font (pursuant to JIS), polygon information 47 showing the information on each of the polygons constituting the character, and point information 48 showing the information on each of the points constituting the polygon.

In addition, the character code 46 includes the number of polygons constituting the character. The polygon information 47 includes the number of points constituting the polygon. The point information 48 includes the point number and coordinates of the point, and modification attributes (flags) which are information on component pasting process.

The modification attributes of the point information 48 are to specify a component pasting method effective to each of the process-target parts in a character of the basic font. The point is comprised of eight flags of an element start-point flag 49 showing the start point of the element, an element end-point flag 50 showing the end point of the element, a pasting flag 51 for specifying whether or not the component pasting is effected, a flag 52 for specifying which of the first component or the second component is pasted for generation of the TWIG font, a flag 53 for specifying which of the first component or the second component is pasted for generation of the PRINCESS font, a flag 54 for specifying which of the first component or the second component is pasted for generation of the PIERROT font, a flag 55 for specifying which of the first point or the second point is taken as the reference point of component pasting for generation of the PIERROT font, and a flag 56 for specifying which of the first component or the second component is pasted for generation of the TUKUSI font.

These flags may be appropriately increased in number.

The outline character data as shown in FIG. 3 contains the font name of POP, the character of "AI" (a kanji character meaning "love") whose JIS code is 3026 out of the characters belonging to the POP font, and the point information of a polygon 71 whose polygon number 13 is out of the thirteen polygons that this character has, as shown in FIG. 12A.

The polygon 71 has four plotting points a1, $a_4$, $a_5$, $a_8$ (hereinafter, simply using the term, "point", refers to a plotting point) as well as four control points $a_2$, $a_3$, $a_6$, $a_7$, as shown in FIG. 12B.

In the paste component data storage 20, paste component data have been stored. This paste component data is expressed by using straight lines and Bezier curves, as in the outline character data. The paste component data is comprised of a component code 57 that is the serial number for paste component data of all the paste components including the first components and the second components, polygon information 58 showing the information on polygons constituting the paste component, and point information 59 showing the information on points constituting the polygon, as shown in FIG. 4.

The component code 57 includes the number of polygons constituting the component. The polygon information 58 includes the number of points constituting the polygon. The point information 59 includes the point number and coordinates of the point.

The paste component data as shown in FIG. 4 represents the paste component of the component number 3 as shown in FIG. 13C.

The character generation device having the above constitution generates outline character data of a character of a new font through the following operation.

FIGS. 6 through 11 are flow charts for the operation of character generation process to be executed under the control of the CPU 14. The operation of character generation process for generating character data of JIS code 3026, "AI", in the fonts as shown in FIGS. 14A to 14E (FIG. 14A for the font name, TWIG; FIG. 14B for the font name, PRINCESS; FIG. 14C for the font name, CRYSTAL; FIG. 14D for the font name, PIERROT; FIG. 14E for the font name, TUKUSI), with the outline character data of the font shown in FIG. 12A used as the outline character data of the basic font and with the use of the paste component data of the paste components shown in FIGS. 13A to 13I, is described below in detail according to FIGS. 6 to FIG. 11.

At step S1, the font code (2: TWIG, 3: PRINCESS, 4: CRYSTAL, 5: PIERROT, or 6: TUKUSI) and the character number (3026) of the character to be generated are entered from the keyboard 11.

At step S2, the font name of the basic font for a font specified at step S1 is determined by the shape recognizer 24 with reference to the basic font code 33 of the font attribute storage 18 in the auxiliary memory 12. Then, out of the outline character data stored in the character data storage 19, outline character data that is the outline character data of a font specified by the font name of the basic font, and that is the outline character data of the character, "AI", specified by the character number (3026) entered at step S1 is read out. The read-out outline character data is stored in the input buffer 21 in the main memory 13.

At step S3, polygon information 47 constituting this outline character data is read out by the shape recognizer 24 from the outline character data stored in the input buffer 21 at step S2.

At step S4, all the point information 48 of the read-out polygon information 47 is stored in the work memory 27 by the shape recognizer 24.

At step S5, all the process-target elements belonging to the polygons represented by the polygon information 47 are searched for by the shape recognizer 24 as follows.

First, a point number with the element start-point flag 49 on is searched for based on the point information 48 stored in the work memory 27. Further, a point number with the element end-point flag 50 on is searched for clockwise (i.e., in the ascending order of point numbers) along the outline of the polygon, beginning by the point with the element start-point flag 49 on. Then, an element present between the searched two points is recognized as a process-target element that is the target of the modification process. From now on, the above operation is repeated until all the process-target elements are recognized.

As a result, for example as shown in FIG. 12B, the element whose start point is the point $a_4$ and whose end point is the point $a_5$ is recognized as the process-target element.

At step S6, out of the process-target elements searched out at step S5, one unprocessed element is selected by the paste component data modifier 25. Also, with the component number 34 in the font attribute storage 18 of the auxiliary memory 12 referenced based on the font code entered at step S1, paste component data corresponding to the font to be generated is read out from the paste component data storage 20. Then, the read-out paste component data is stored in the input buffer 21 of the main memory 13.

At step S7, with reference to the scaling information 38 in the modification information 35 of the font attribute storage 18, it is decided by the shape recognizer 24 whether or not the size of the paste component is scaled up/down in accordance with the process-target element. As a result, if it is scaled up/down, the program goes to step S8; if not, it goes to step S21.

In the case of the font attributes as shown in FIG. 2, only the TUKUSI font is specified not to be scaled up/down. Accordingly, for the generation of TUKUSI font, the program goes to step S21.

At step S8, with reference to the pasting flag 51 of the point information 48 stored in the work memory 27, it is decided by the shape recognizer 24 whether or not the component pasting is effected for each element. As a result, if the component pasting is effected, the program goes to step S9; if not, it goes to step S57.

At step S9, when both the first component number 36 and the second component number 37 are present in the component number 34 of the font attributes corresponding to the font code entered at step S1, it is decided by the shape recognizer 24 which paste component of the first component or the second component is used, with reference to the flags 52 to 54 and 56 of the point information 48 stored in the work memory 27. As a result, if the first component is used, the program goes to step S10; if the second component is used, it goes to step S41.

In the case of CRYSTAL font, which has the only one kind of paste component, the program goes to step S10 in all cases.

At step S10, the length D1 of the process-target element selected at step S6 (which is assumed here to be a process-target element whose start point is point $a_4$ and whose end point is point $a_5$) is calculated by the shape recognizer 24 in the following way.

Figure 15:
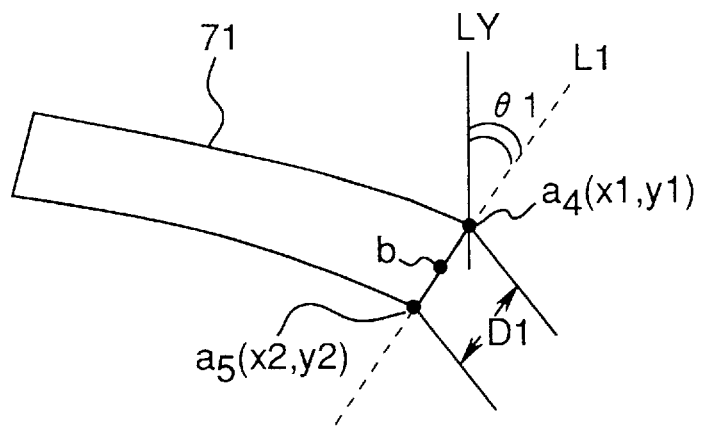
FIG. 15 is an explanatory view of the determination of length and angle of a process-target element.

As shown in FIG. 15, by using the coordinates $(a_4(x1, y1), a_5(x2, y2))$ of the points $a_4$, $a_5$ of the polygon 71, the distance D1 between the points $a_4$, $a_5$ is calculated by the following equation:

$$D1 = \{(x2-x1)^2 + (y2-y1)^2\}^{1/2}$$

The distance D1 thus calculated is stored in the work memory 27 as the length of the process-target element.

Figure 16:
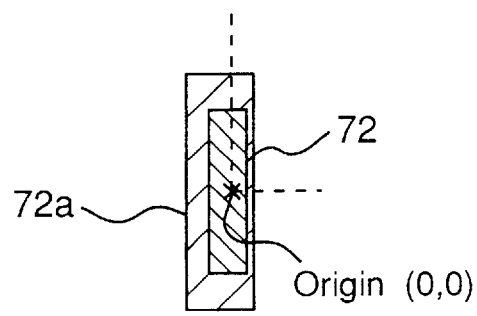
FIG. 16 is an enlarged explanatory view of the paste components shown in FIG. 13.

At step S11, the paste component data of the first component stored in the input buffer 21 at step S6 is scaled up or down by the paste component data modifier 25 with the origin (0, 0) taken as the center as shown in FIG. 16, responsive to the length D1 of the process-target element calculated at step S10, and by the following equation:

$$D1/D*E$$

where D is the reference length of the element and E is the reference length of the paste component 72 corresponding to D.

At step S12, with reference to the information 39, 40 in the modification information 35 of font attributes stored in the font attribute storage 18, it is decided by the shape recognizer 24 which angle of the element angle to the y-axis or the stroke angle to the x-axis is determined. As a result, if the element angle is determined, the program goes to step S13; if the stroke angle is determined, it goes to step S15; and if both angles are determined, the program goes to step S17.

In the case of the font attributes as shown in FIG. 2, to determine the element angle is decided for the generation of TWIG font. For the generation of PRINCESS font, PIERROT font, or TUKUSI font, to determine the stroke angle is decided. Also, to determine both angles is decided for the generation of CRYSTAL font.

At step S13, the element angle θ1 used in the generation of TWIG font is determined by the shape recognizer 24 as follows.

As shown in FIG. 15, an intersection angle θ1 between a line L1 connecting the two points $a_4$, $a_5$, which are both ends of the process-target element, and a line LY parallel to the y-axis is calculated.

Figure 17:
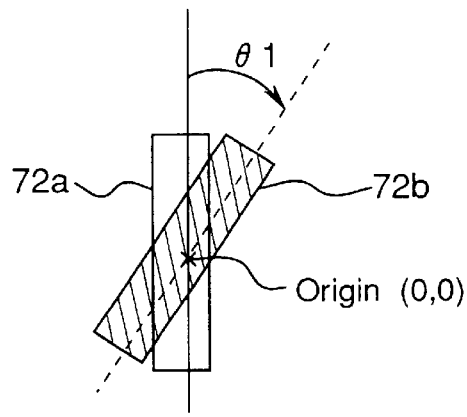
FIG. 17 is an explanatory view of the rotation of the paste component shown in FIG. 16.
Figure 18:
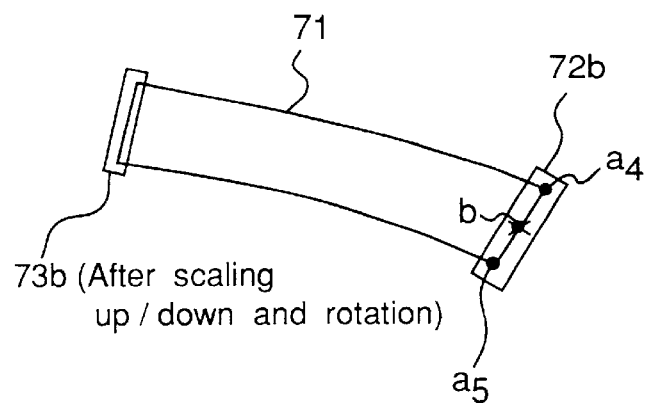
FIG. 18 is a view showing a state in which the paste component shown in FIG. 17 is applied onto the process-target element shown in FIG. 15.

At step S14, determined by the paste component data modifier 25 is paste component data resulting from a process that a paste component 72a scaled up/down at step S11 is rotated by an angle θ1 from the y-axis about the origin (0, 0), as shown in FIG. 17.

After these steps, the program goes to step S52.

At step S15, a stroke angle θ2 of the stroke to which the target element used in the generation of PRINCESS font, PIERROT font, or TUKUSI font belongs is determined by the shape recognizer 24 in the following way.

Figure 19:
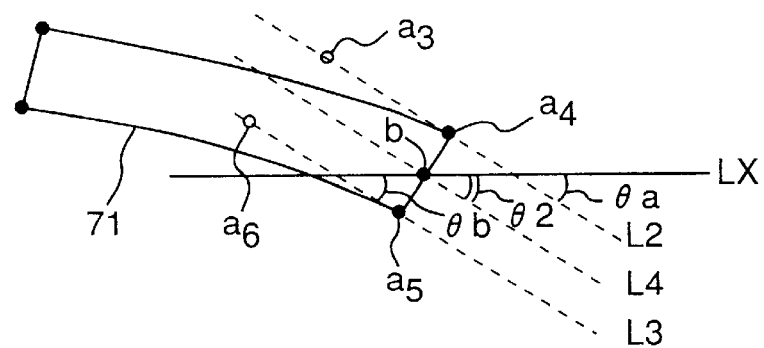
FIG. 19 is an explanatory view of the determination of the angle of a stroke to which the process-target element belongs.
Figure 20:
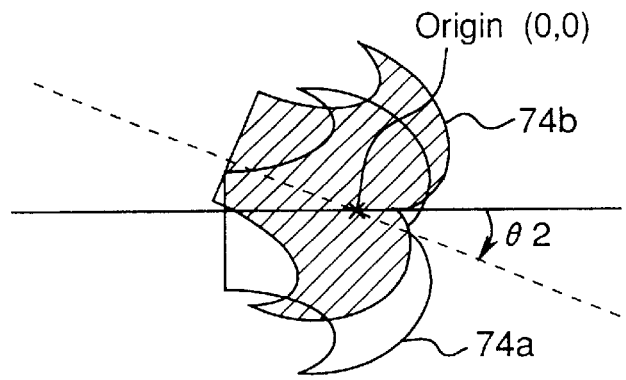
FIG. 20 is an explanatory view of the rotation of a paste component different from the paste component shown in FIG. 17.
Figure 21:
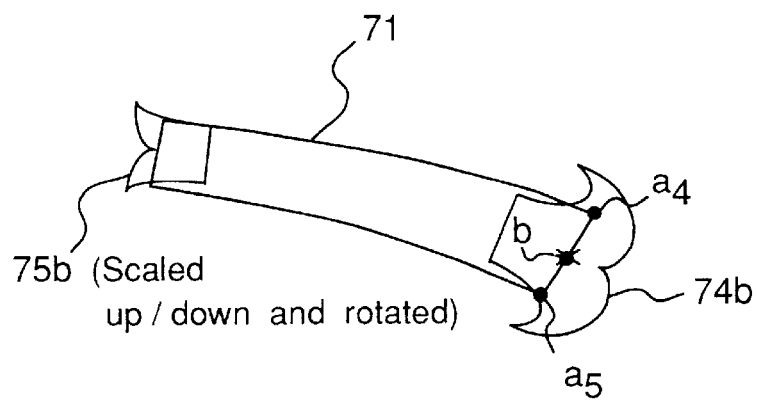
FIG. 21 is a view showing a state in which the paste component shown in FIG. 20 is applied onto the process-target element shown in FIG. 19.

Referring to FIG. 19, an intersection angle θa at which a line L2 (dx, dy) that connects the point $a_4$, which is the start point of the process-target element, to a plotting point or control point just one before the point $a_4$ (the control point $a_3$ in this embodiment) along the direction in which the plotting points and the control points constituting the polygon are arranged, is intersected by a line LX parallel to the x-axis is determined by a function atan2 (dx, dy) that serves to determine the intersection angle of two lines. Similarly, an intersection angle θb at which a line L3 that connects the point $a_5$, which is the end point of the process-target element, to a plotting point or control point just one after the point $a_5$ (the control point $a_6$ in this embodiment), is intersected by the line LX is determined. Then, the average value of the two intersection angles θa, θb is assumed as the angle 62 to the x-axis of the stroke to which the process-target element belongs.

At step S16, paste component data that is obtained by rotating the paste components 74a, 77a, 79a scaled up/down at step S11, by an angle θ2 from the x-axis about the origin (0, 0), as shown in FIGS. 20, 26A, 26B, and 29 is determined by the paste component data modifier 25.

After these steps, the program goes to step S52.

Figure 22:
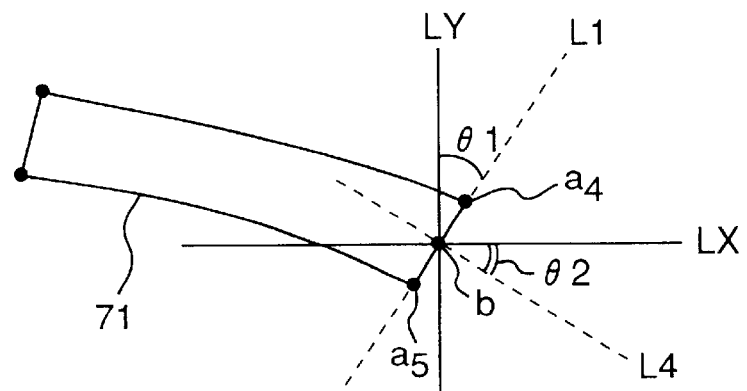
FIG. 22 is an explanatory view of the angle of a process-target element, and the determination of the angle of a stroke to which the process-target element belongs.

At steps S17 and S18, the element angle θ1 and the stroke angle θ2 used for the generation of the CRYSTAL font are determined as in the steps S13 and S15 (FIG. 22).

Figure 23A:
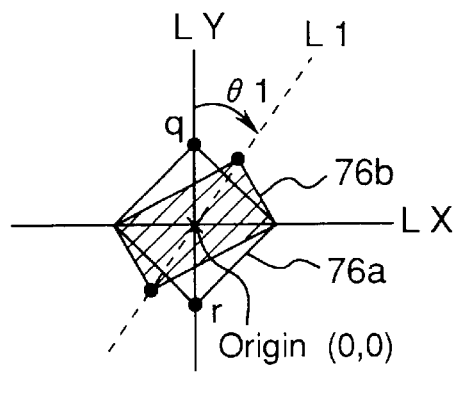
FIGS. 23A and 23B are explanatory views of the rotation of a paste component different from the paste components shown in FIG. 17 and FIG. 20.

At step S19, paste component data that is obtained by rotating a paste component 76a scaled up/down at step S11, with the origin (0, 0) taken as the center, to such an extent that the diagonal line qr is rotated by an angle equal to the element angle θ1 from the line LY is determined by the paste component data modifier 25, as shown in FIG. 23A.

Figure 23B:
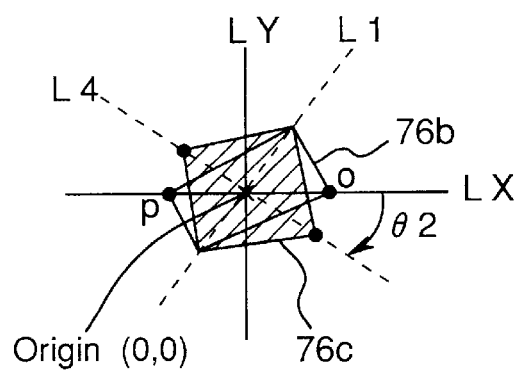
Figure 24:
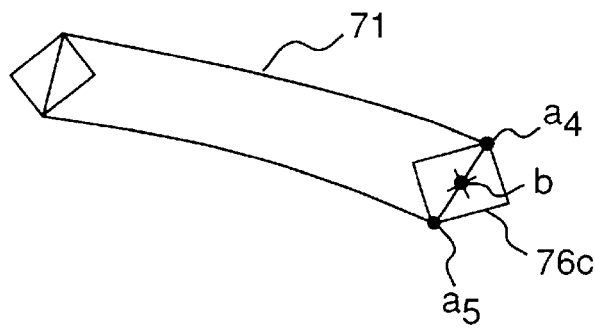
FIG. 24 is a view showing a state in which the paste component shown in FIGS. 23A and 23B is applied onto the process-target element shown in FIG. 22.

At step S20, paste component data that is obtained by rotating a paste component 76b whose diagonal line qr has been rotated by the angle θ1 at step S19, with the origin (0, 0) taken as the center, to such an extent that the diagonal line po is rotated by an angle equal to the stroke angle θ2 from the line LX is determined by the paste component data modifier 25, as shown in FIG. 23B.

After these steps, the program goes to step S52.

At steps S21 to c23, it is decided whether or not the component pasting is effected, whether or not the first component is used, and which angle is determined, as in the steps S8, S9, and S12.

At steps S24 to S31, the element angle θ1 and the stroke angle θ2 are determined, and based on the determined element angle θ1 or stroke angle θ2, the rotation process with the paste component data of the first component stored in the input buffer 21 is carried out, as in the steps S13 to S20.

After these steps, the program goes to step S52.

At steps S32 to S40, it is decided which angle is determined, the element angle θ1 and the stroke angle θ2 are calculated, and the rotation process with the paste component data of the second component stored in the input buffer 21 is carried out, as in the steps S12 to S20.

After these steps, the program goes to step S52.

At steps S41 to S51, the length Di of the process-target element is calculated, the paste component data of the second component stored in the input buffer 21 is scaled up/down, it is decided which angle is determined, the element angle θ1 and the stroke angle θ2 are calculated, and the paste component data of the second component after the scaling up/down process is rotated, as in the steps S10 to S20.

After these steps, the program goes to step S52.

At step S52, with reference to the information 41 in the modification information 35 of font attributes stored in the font attribute storage 18 and the flag 55 in the point information 48 stored in the work memory 27, it is decided by the data synthesizer 26 on which point the origin of the paste component subjected to the scaling up/down process and the rotation process as described above is superposed (i.e., where the reference point for pasting is).

As the reference point, there are available three kinds, the element start point $a_4$, the element midpoint b, and the element end point $a_5$ in FIG. 15. In the case of the modification information 35 as shown in FIG. 2, since only the PIERROT font is specified that some point other than the midpoint b should be taken as the reference point, it is decided whether the reference point is the element start point or the element end point, with reference to the flag 55 of the point information 48 for the generation of the PIERROT font.

As a result of the decision, if the element start point is taken as the reference point, the program goes to step S53; if the midpoint is taken as the reference point, it goes to step S54; and if the element end point is taken as the reference point, the program goes to step S55.

In this connection, if it has been decided at step S8 that the component pasting is not effected (i.e., the pasting flag 51 in the point information 48 is not set), the steps S9 and S52 are skipped, so that the flags 52 to 56 in the point information 48 are all nullified.

Figure 26A:
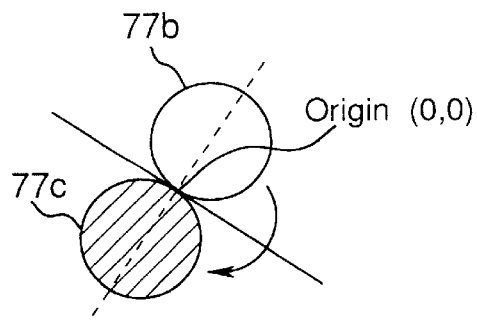
FIGS. 26A and 26B are explanatory views of the rotation of a paste component different from the paste components shown in FIG. 17, FIG. 20, and FIGS. 23A and 23B.
Figure 26B:
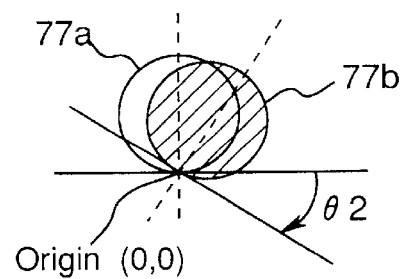
Figure 27A:
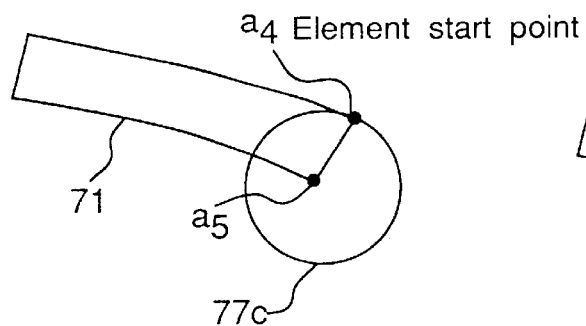
FIGS. 27A and 27B are views showing a state in is which the paste component shown in FIGS. 26A and 26B is applied in a method different from application methods shown in FIG. 18, FIG. 21, and FIG. 24.

At step S53, in the case of the PIERROT font, such paste component data is determined by the paste component data modifier 25 that a component 77b that has been subjected to the scaling up/down process and the rotation process at steps S11 and S16 is reflected by the horizontal axis as shown in FIG. 26A and that the origin of a reflected component 77c is moved to the coordinates of the element start point $a_4$ of the process-target element as shown in FIG. 27A.

After these steps, the program goes to step S56.

At step S54, paste component data that is obtained by moving the origins of components 72b, 74b, 76c, 79b that have been subjected to the scaling up/down process and the rotation process as described above, to the midpoint b between the element start point $a_4$ and the element end point $a_5$ of the process-target element as shown in FIGS. 18, 21, 24, and 30 is determined by the paste component data modifier 25.

After the step, the program goes to step S56.

Figure 27B:
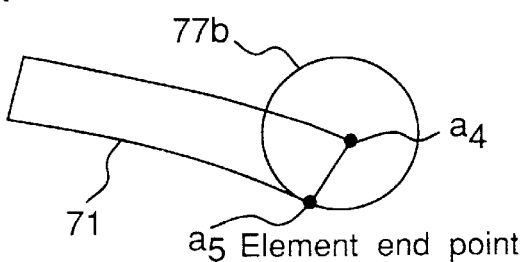
Figure 28:
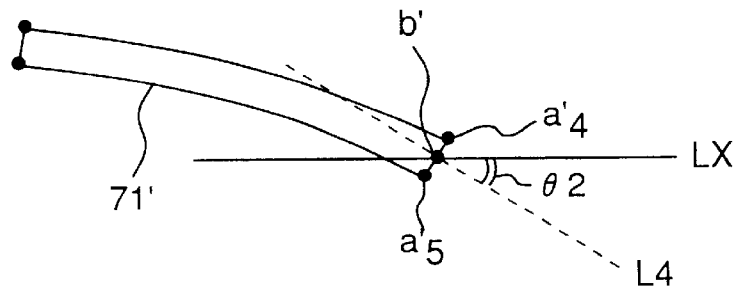
FIG. 28 is an explanatory view of the determination of the angle of a stroke to which a processtarget element belongs.
Figure 29:
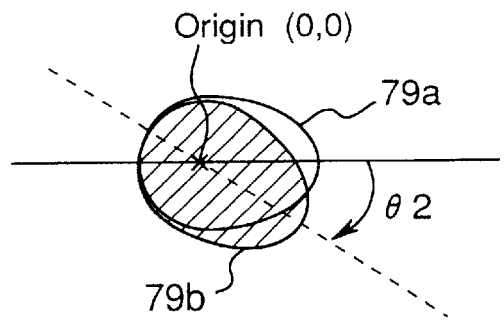
FIG. 29 is an explanatory view of the rotation of a paste component different from the paste components shown in FIG. 17, FIG. 20, FIGS. 23A and 23B, and FIGS. 26A and 26B.

At step S55, in the case of the PIERROT font, paste component data that is obtained by moving the origin of the component 77b that has been subjected to the scaling up/down process and the rotation process as described above, to the element end point $a_5$ of the process-target element, as shown in FIG. 27B is determined by the paste component data modifier 25.

At step S56, paste component data that has been subjected to the scaling up/down process, the rotation process, and the moving process as described above is stored in the output buffer 22 of the main memory 13 by the data synthesizer 26.

At step S57, it is decided by the shape recognizer 24 whether or not the processes for all the process-target elements in the polygon information 47 read out at step S3 have been completed. As a result, if they have been completed, the program goes to step S58; if not, the program returns to step S6, where the recognition process for the next process-target element is conducted.

This decision is made depending on whether or not the number of pieces of paste component data stored in the output buffer 22 at step S56 is coincident with the number of process-target elements that have been searched out at step S5.

At step S58, the polygon information 47, read out at step S3 and stored in the work memory 27, is stored in the output buffer 22 by the data synthesizer 26.

In this connection, the paste component data stored in the output buffer 22 in step S56 have been positioned at steps S53, step S54, or step S55 so as to be superposed on the process-target elements of the polygon 71 that depends on the polygon information 47 stored in this step. Therefore, at the time point when this step is completed, the outline character data that paste components corresponding to the elements of the polygon 71 have been pasted as in FIGS. 18, 21, 24, 27, or 30 have been stored in the output buffer 22.

At step S59, it is decided by the shape recognizer 24 whether or not the processes for all the polygons in the outline character data read out at step S2 have been completed. As a result, if they have been completed, the program goes to step S60; if not, it returns to step 3, where the process for the next polygon is conducted.

This decision is made depending on whether or not the number of pieces of polygon information stored in the output buffer 22 at step S58 is coincident with the number of polygons constituting the relevant character of the character code 46 in the outline character data stored in the input buffer 21.

At step S60, the outline character data of one character stored in the output buffer 22 is transferred to the bit map memory 15 or the auxiliary memory 12. After completing these steps, the operation of character generation process is ended.

It is noted that the outline character data transferred to the bit map memory 15, after being developed into bit map data, is either displayed on the display unit 16 or printed by the output unit 17.

As described above, in this embodiment, outline character data of a basic font is stored in the character data storage 19 of the auxiliary memory 12, while the paste component data, which is the outline character data of paste components, is stored in the paste component data storage 20. Then, upon an input of a font code and a character number from the keyboard, paste components obtained by referring to the component number 34 are scaled up/down, rotated, and moved based on the reference results of the modification information 35, and pasted on the process-target element of the character in the basic font (basic character) obtained by referring to the basic font code 33 of the font attribute storage 18 based on the input font code, by the shape recognizer 24 and the paste component data modifier 25 constituting the CPU 14.

Therefore, according to this embodiment, for the generation of character data of a new font, it is not necessary for the designer to design characters one by one. Instead, by only entering a font code and a character number, the character data of a new font can be automatically generated. In this process, as stated above, the element shape of a basic character is changed by applying paste components to the process-target element of the basic character. Thus, without the need of calculating new plotting points or deleting/connecting plotting points, a high-grade multiple font system can be easily implemented with small data amounts and less manhours for development.

The shape recognizer 24 determines the length and angle of the process-target element, as well as the angle of the stroke to which the process-target element belongs. Then, paste component data is determined by scaling up/down the paste component according to the length of the process-target element and by rotating it according to the angle of the process-target element or the stroke by means of the paste component data modifier 25, futher, outline character data is generated by superposing the paste component data, which has resulted from the scaling up/down process and the rotation process, on the outline character data of the process-target element of the basic character by the data synthesizer 26.

Accordingly, regardless of the length and tilt of the process-target element, a font of natural impression is generated by applying paste components of appropriate sizes onto the process-target element at appropriate angles.

Also, the shape recognizer 24 is so arranged as to execute the decision of the pasting method for paste components, such as the selection as to whether or not the component pasting is done, the selection of the type of component, the selection as to whether or not the scaling up/down process of component is done, and the selection of the pasting reference point, based on both the modification information 35 of the font attributes associated with the font code and the flags 51 to 56 of the point information 48 imparted to the polygon information 47.

Accordingly, by setting the modification information 35 and the flags 51 to 56 to optimum ones, any collapses due to contact between components or between component and stroke can be avoided so that the character grade can be prevented from deterioration. It is also possible to change the pasting method for different fonts to be generated, even with the same element in the same basic character. Thus it is enabled to develop an abundance of variations of fonts filled with originalities.

In this embodiment, the algorithm for the character generation processes to be executed under the control of the CPU 14 is not limited to the flow charts as shown in FIGS. 6 to 11.

For instance, in the flow charts of character generation process in this embodiment, it has been arranged that the decision of the scaling up/down process is made depending on the lengths of process-target elements uniformly for all the paste components, with respect to one font to be generated. However, the flow charts may be modified by adding the flags for the modification attributes so as to be capable of such combinations that only particular elements are scaled up/down while the other elements are not.

Figure 25A:
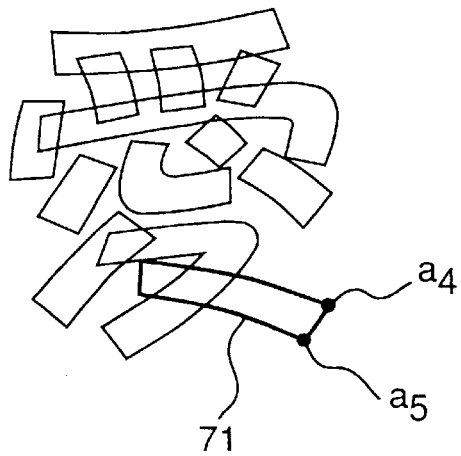
FIGS. 25A and 25B are views showing examples in which the stroke width of the character of outline character data shown in FIGS. 12A and 12B is changed.
Figure 25B:
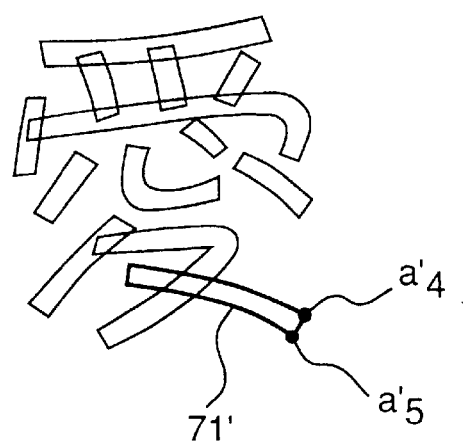
Figure 30:
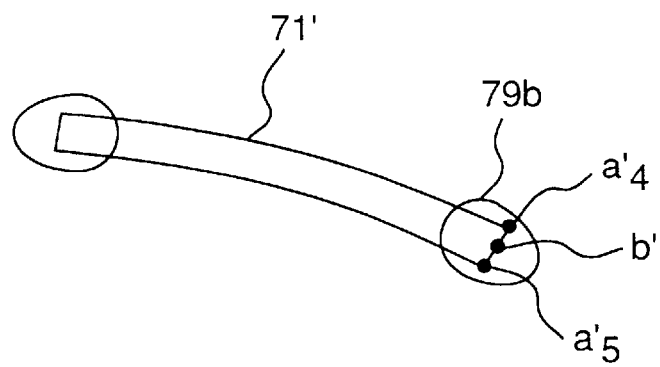
FIG. 30 is a view showing a state in which the paste component shown in FIG. 29 is applied onto the process-target element shown in FIG. 28.
Figure 31A:
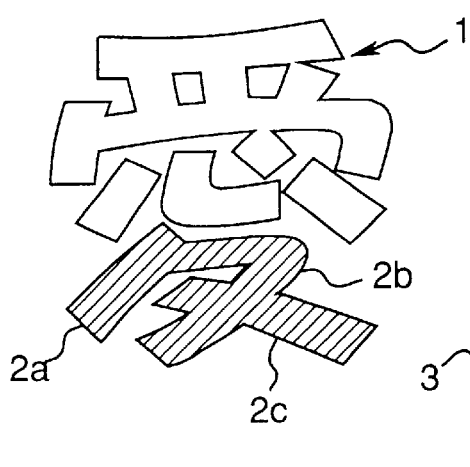
FIGS. 31A and 31B are explanatory views of elements.
Figure 31B:
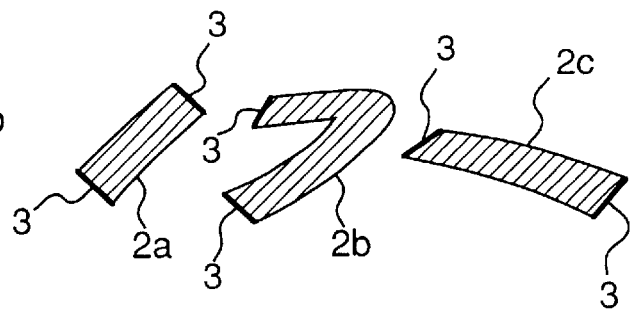
Figure 32A:
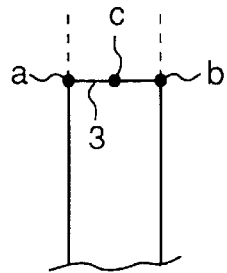
FIGS. 32A, 32B, and 32C are explanatory view of a method for changing an element shape according to the prior art.
Figure 32B:
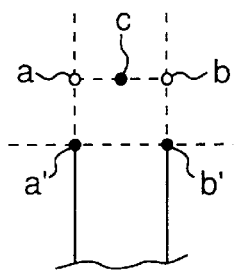
Figure 32C:
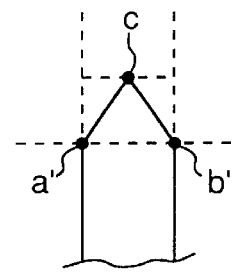
Figure 33A:
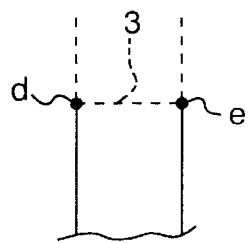
FIGS. 33A, 33B, and 33C are explanatory views of a method for changing an element shape according to the prior art, other than the method of FIGS. 32A, 32B, and 32C.
Figure 33B:
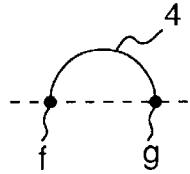
Figure 33C:
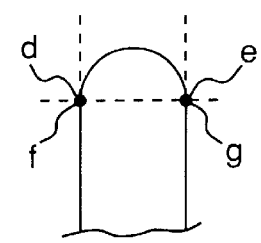
Figure 34:
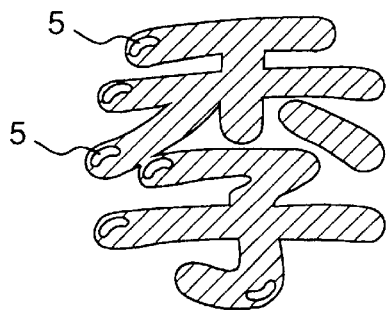
FIG. 34 is a view showing an example of fonts obtained by changes in an element shape.

It is also possible, in combination with a device for changing the stroke width of the basic font, to apply a paste component scaled up or down and rotated as shown in FIG. 30 with respect to, for example, a polygon 71 'that has been narrowed by thinning the line width of each stroke as shown in FIG. 25B.

In addition, although the character data used in this embodiment is outline character data obtained by approximating the outlines of polygons with straight lines and Bezier curves, the present invention is not limited to this arrangement. The only requirement is that the character data allows the profiles of characters to be converted into outlines in the end.

As is apparent from the foregoing description, when a font to be generated is entered from the input section, character data of a basic character of the specified font is read out with reference to the font attributes stored in the font attribute storage, and the shape of a processtarget part is recognized based on the character data, by the shape recognizer. Then by the component data modifier, component data is modified so that the size and disposition of a component to be used match the shape of the process-target part, with reference to the font attributes. Then by the data synthesizer, the character data read out by the shape recognizer and the component data modified by the component data modifier are synthesized so that character data with the component superposed on the process-target part of the basic character is generated. Thus, without the need of calculating new plotting points or deleting/connecting plotting points, character data of a new font can be generated simply by the modification and superposition of the component data.

Therefore, according to the present invention, a multiple font system can be easily implemented with low numbers of manhours for development, without increasing the data amount.

Further, since the component data is modified so that the size and disposition of the component matches the shape of the process-target part, it is enabled to superpose the component on the process-target part so that a natural impression is given, regardless of the shape of the process-target part.

In an embodiment, the character data has superposition information for each of the process targets of a basic character and for each of the fonts to be generated. Therefore, it is enabled to change the superposition method for each of the process-target parts or for each of the fonts to be generated, even with the same basic character.

In an embodiment, the shape recognizer in the character generation device decides the superposition method with reference to both the modification information of font attributes and the superposition information of character data, and then recognizes the shape based on the decision result. Therefore, any collapses due to contact between components or between component and process-target part can be avoided by changing the superposition method for each of the process-target parts or for each of the fonts to be generated, even with the same basic character.

Thus, according to this embodiment, for instance, for the generation of the PIERROT font with the POP characters taken as the basic font, the paste component 77 and the stroke can be prevented from contacting each other, by changing the reference point of pasting at the element start point and the element end point, as appropriate, by applying or not applying the paste component 77 (see FIG. 13F) for each of the elements as shown in FIG. 14D.

In an embodiment, the shape recognizer in the character generation device recognizes the length of the element of the basic character. Therefore, the component to be used can be scaled up or down so as to match the length of the element of the basic character.

In an embodiment, the shape recognizer of the character generation device recognizes the tilt angle of at least either one of the element of the basic character or the stroke to which the element belongs. Therefore, the component can be superposed at a tilt angle matching the tilt angle of the element or the stroke.

Figure 14A:
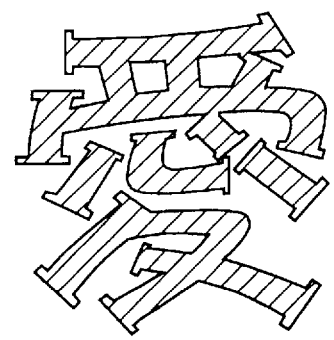
FIGS. 14A, 14B, 14C, 14D, and 14E are views showing an example of a newly generated font.
Figure 14B:
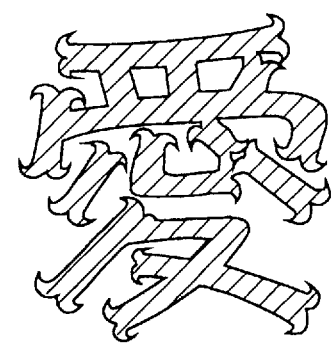
Figure 14C:
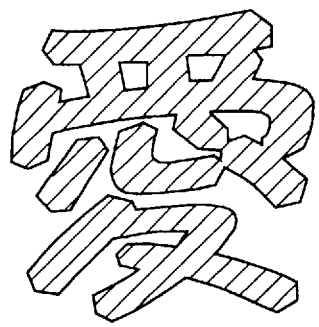
Figure 14D:
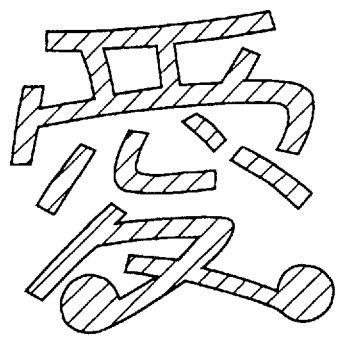
Figure 14E:
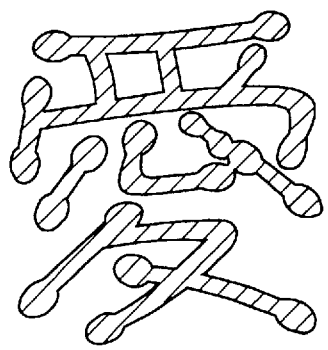

Thus, according to this embodiment, it is enabled to generate characters of such a font that the flow of a stroke to which the element belongs is blocked with stress effectively placed thereon as shown in FIG. 14A, or characters of such a font that a natural impression matching the flow of the stroke is given as shown in FIG. 14B.

In an embodiment, the component data modifier of the character generation device modifies component data so that the length of the component to be used matches the length of the process-target part or that the tilt angle matches the tilt angle of at least either one of the element or the stroke. Therefore, the component to be used can be scaled up or down and rotated so as to match the length of the element or to match the tilt angle of the element or the stroke.

Thus, according to this embodiment, a component can be superposed on the element of a character of the basic font at a length or tilt angle free from incongruity, so that characters of a font that gives a natural impression can be generated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A character generation device for generating characters of a new font by superposing a component of a shape on a target portion of a character in a basic font to change a shape of the target portion, the character generation device comprising:

font attribute storage for storing font attributes including a font code indicative of a font, a font name, a basic font code indicating a font that serves as a basis of the pertinent font, a component code indicating a component to be used for generation of the font, and modification information for generating the font;

character data storage for storing character data representing the shape of a character in the basic font;

component data storage for storing component data representing the shape of the component;

an input section for specifying a new font to be generated;

a shape recognizer for reading out, from the character data storage, the character data of a character in a font that serves as the basis of the new font specified by the input section, with reference to the font attributes, and for recognizing the shape of a target portion of the character in the basic font based on the read-out character data;

a component data modifier for reading out, from the component data storage, component data to be used for the generation of the new font specified from the input section with reference to the font attributes, and modifying the read-out component data based on the shape of the target portion so that size and disposition of the component to be used matches the shape of the target portion; and a data synthesizer for generating character data of a character in the specified new font, which character is made up by superposing the component on the target portion of a character in the basic font, based on both the character data of the basic font read out by the shape recognizer and the component data modified by the component data modifier.

2. The character generation device according to claim 1, wherein the character data stored in the character data storage has superposition information to be used for the superposition of the component, for each of individual target portions of a character in the basic font and for each of individual fonts to be generated.

3. The character generation device according to claim 2, wherein the shape recognizer selects a component superposition method with reference to the modification information of font attributes, as well as a corresponding font and superposition information of the target portion in the read-out character data, and performs the recognition of the shape based on a result of the selection.

4. The character generation device according to claim 1, wherein the target portion, the shape of which is recognized by the shape recognizer, is an element which is an end portion of any stroke constituting the character; and the shape recognizer recognizes a length of the element in a character in the basic font.

5. The character generation device according to claim 1, wherein the target portion, the shape of which is recognized by the shape recognizer, is a stroke constituting the character and an element which is an end portion of the stroke; and the shape recognizer recognizes a tilt angle of at least one of the element of a character in the basic font, and the stroke to which the element belongs.

6. The character generation device according to claim 4, wherein the component data modifier modifies the component data so that the length of the component to be used matches the length of the element or so that a tilt angle of the component to be used matches a tilt angle of at least one of the element and the stroke.

7. The character generation device according to claim 5, wherein the component data modifier modifies the component data so that a length of the component to be used matches a length of the element or so that the tilt angle of the component to be used matches the tilt angle of at least one of the element and the stroke.

8. A method of character generation for generating characters of a new font by superposing a component of a shape on a target portion of a character in a basic font to change a shape of the target portion, the method of character generation comprising:

a) storing font attributes including a font code indicative of a font, a font name, a basic font code indicative of a font that serves as a basis of the pertinent font, a component code indicative of a component to be used for generation of the font and modification information for generating the font;

b) storing character data representing the shape of a character in the basic font;

c) storing component data representing the shape of the component;

d) selecting a font to be generated;

e) reading out stored character data of a character in a font that serves as the basis of the new font selected in said step d) with reference to the font attributes and recognizing the shape of a target portion of the character in the basic font based on the read character data;

f) reading out stored component data to be used for the generation of the new font selected in said step d) with reference to the font attributes and modifying the read component data based on the shape of the target portion so that size and disposition of the component to be used matches the shape of the portion; and g) generating character data of a character in the specified new font, which character is made by superposing the component on the target portion of a character in the basic font, based on both the character data of the basic font read out in said step e) and the component data modified in said step f).

9. The method of character generation according to claim 8, wherein the character data stored in said step b) has superposition information to be used for the superposition of the component, for each of individual target portions of a character in the basic font and for each of individual fonts to be generated.

10. The method of character generation according to claim 9, wherein said step e) comprises selecting a component superposition method with reference to the modification information of font attributes, as well as a corresponding font and superposition information of the target portion in the read character data, and performing the recognition of the shape based on a result of the selection.

11. The method of character generation according to claim 8, wherein the target portion, the shape of which is recognized in said step e), is an element which is an end portion of any stroke constituting the character, said step e) comprises recognizing length of the element in a character in the basic font.

12. The method of character generation according to claim 11, wherein said step f) comprises modifying the read component data so that the length of the component to be used matches the length of the element.

13. The method of character generation according to claim 8, wherein the target portion, the shape of which is recognized in said step e) , is a stroke constituting the character and an element which is an end portion of the stroke, said step e) comprising recognizing a tilt angle of at least one of the element of a character in the basic font and the stroke to which the element belongs.

14. The method of character generation according to claim 13, wherein said step f) comprises modifying the component data so that the tilt angle of the component to be used matches the tilt angle of at least one of the element and the stroke.

* * * * *